United States Patent
Robertson et al.

(10) Patent No.: US 6,322,040 B1
(45) Date of Patent: Nov. 27, 2001

(54) SYSTEM AND METHOD FOR PROVIDING A RUGGEDIZED OPTICAL MOUNTING SYSTEM FOR USE ON AIRCRAFT

(75) Inventors: Richard L. Robertson; Mark A. Woytassek, both of Cedar Rapids, IA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 0 days.

(21) Appl. No.: 09/384,664

(22) Filed: Aug. 27, 1999

(51) Int. Cl.$^7$ .................................................. F16M 13/00
(52) U.S. Cl. ............................................ 248/636; 248/913
(58) Field of Search ............................... 248/636, 287.1, 248/913, 178.1, 476, 183, 179, 562, 485, 550, 638

(56) References Cited

U.S. PATENT DOCUMENTS

| | | | |
|---|---|---|---|
| 4,298,248 | * 11/1981 | Lapp | 248/179 |
| 4,601,452 | * 7/1986 | Rando | 248/178 |
| 4,690,507 | * 9/1987 | Zimmermann | 248/562 |
| 4,936,655 | * 6/1990 | Leib et al. | 248/178 |
| 5,029,791 | * 7/1991 | Ceccon et al. | 248/287 |
| 5,353,167 | * 10/1994 | Kuklo et al. | 248/485 |
| 6,038,013 | * 3/2000 | Ohsaki | 248/638 |

OTHER PUBLICATIONS

"Compact holographic storage demonstrator with rapid access" by Ian McMichael, William Christian, David Pletcher, Tallis Y. Chang, and John H. Hong, published in Allied Optics, vol. 35, No. 14, May 10, 1996.

"Holographic storage promises high data density" published in Laser Focus World, beginning at p. 81, Nov. 1996.

* cited by examiner

Primary Examiner—Ramon O. Ramirez
Assistant Examiner—J. DeLuca
(74) Attorney, Agent, or Firm—Nathan O. Jensen; Kyle Eppele

(57) ABSTRACT

An optical component mounting apparatus for use in an aircraft for maintaining alignment of the optical components during use of the aircraft, the apparatus including an "L" shaped frame and a plurality of "L" shaped mounts, for holding the optical components, in adjustable positions by use of bolts extending through slots, oriented in three orthogonal directions, in the frame and the mounts.

20 Claims, 3 Drawing Sheets

SYSTEM AND METHOD FOR PROVIDING A RUGGEDIZED OPTICAL MOUNTING SYSTEM FOR USE ON AIRCRAFT

FIELD OF THE INVENTION

The present invention generally relates to aviation electronics or avionics, and more particularly relate to optoelectronic avionics, and more particularly relates to holographic optical data processing for avionics equipment.

BACKGROUND OF THE INVENTION

In the past, designers of avionics systems have endeavored to provide systems with improved functionality and simultaneous cost reductions. One example of an area of inquiry has been the use of holographic optical data storage for storage of large amounts of data to be used in flight systems. For example, recently there has been considerable attention given to reduction of controlled flight into terrain (CFIT). Ground collision avoidance systems have been proposed which use GPS receivers and a terrain database to reduce such CFIT accidents. One obstacle in such systems is providing a terrain database, which contains the vast amount of information required, while concomitantly meeting the needs of very fast data retrieval times. Holographic data storage is one possible scheme that could be used.

While these holographic data storage approaches have many advantages, is they also have significant drawbacks.

Holographic data storage systems require very stable conditions. The relatively short wavelengths of the light in the optical range results in a requirement to preserve precise alignment of components to allow for measurement and detection of these optical signals. However, the environment in an aircraft is relatively hostile. The dramatic temperature changes and vibration, which are commonplace on-board an aircraft, are not trivial obstacles when designing an airborne holographic data storage system.

Use of standard optical laboratory component mounting equipment, such as an optical rail which positions mounting brackets along a linear rail member or an optical table, with numerous mounting holes across the table top, has often failed to provide the requisite preservation of alignment of the optical components.

Consequently, there exists a need for improvement in airborne optical systems which address the requirement of precise alignment of optical components in a relatively hostile environment.

SUMMARY OF THE INVENTION

It is an object of the present invention to provide a ruggedized optical mounting system.

It is a feature of the present invention to utilize multiple points of contact between each optical component and the mounting framework It is an advantage of the present invention to allow enhanced stability and alignment control.

It is another feature of the present invention to utilize multiple planes of contact between each optical component and the mounting framework.

It is another advantage of the present invention to provide a cost effective a and compact airborne optical component mounting system.

The present invention is an apparatus and method for mounting and aligning optical components on an aircraft, which is designed to satisfy the aforementioned needs, provide the previously stated objects, include the above-listed features and achieve the already articulated advantages. The present invention is carried out with a "misalignment amplifying lever arm-less system" in a sense that there is a great reduction in the amount of misalignment, which often is amplified as a result of the use of multiple adjustable mounting stages between the mounting framework and the optical component.

Accordingly, the present invention is a system and method for mounting optical components in an airborne environment which includes a multi-planar frame for securing a plurality of optical components in a predetermined orientation where each component is secured through at least one coupling on at least two of the planes of the frame.

BRIEF DESCRIPTION OF THE DRAWINGS

The invention may be more fully understood by reading the following description of the preferred embodiments of the invention, in conjunction with the appended drawing wherein:.

DETAILED DESCRIPTION

Figure 1:
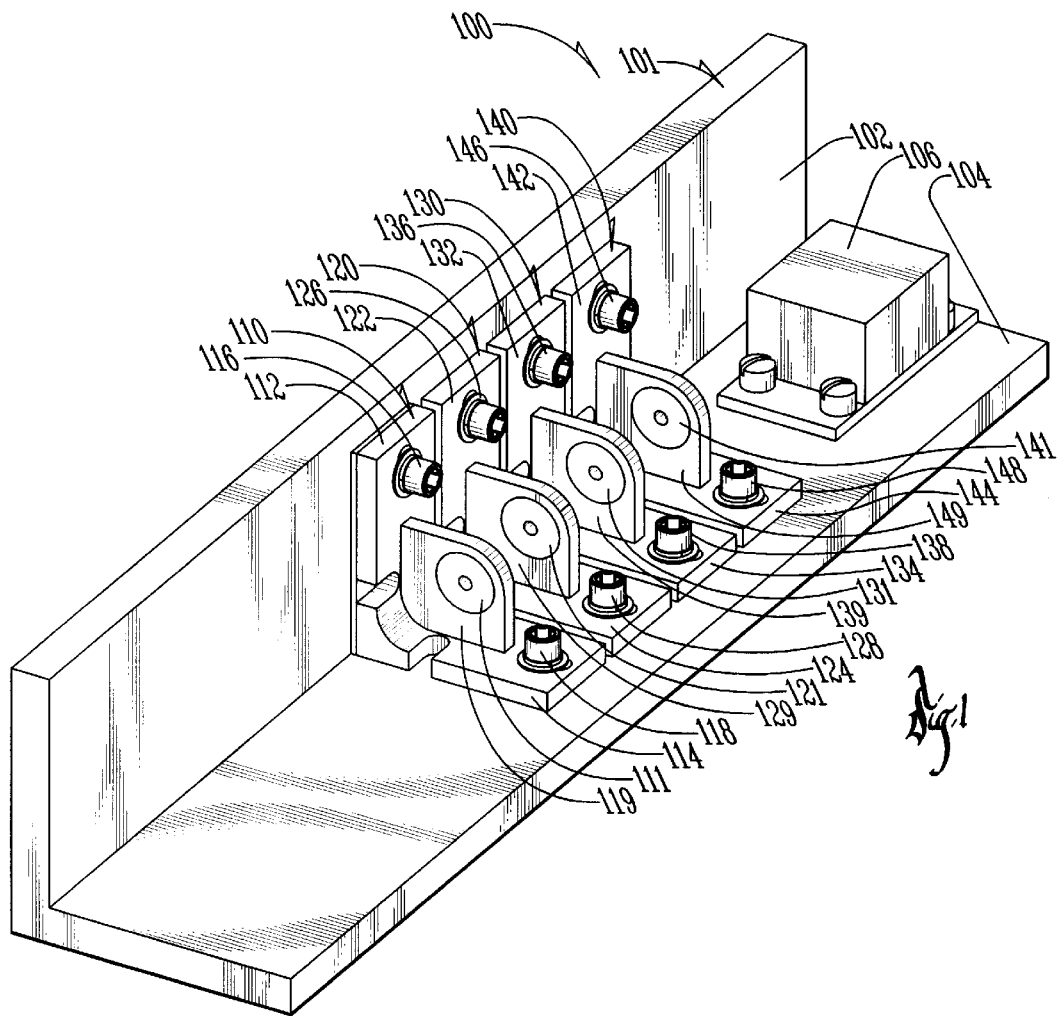
FIG. 1 is a perspective view of an optical mounting frame of the present invention showing several optical components mounted thereon.

Now referring to the drawings, wherein like numerals refer to like matter throughout, and more particularly to FIG. 1, there is shown an apparatus of the present invention generally designated 100, which includes an optical mounting frame 101, having a vertical side 102 and a horizontal side 104 with an optical laser component 106 disposed thereon. The terms vertical and horizontal are used herein to better aid in understanding the Figures; however, an actual implementation of the present invention may be done in any orientation and, in fact, may not have any elements which are oriented in a vertical or horizontal manner or even orthogonal to each other. Optical mounting frame 101 may be made of any suitable material having suitable physical characteristics, such as but not limited to, aluminum, titanium and the like. Preferably, optical mounting frame 101 has vertical side 102 and horizontal side 104 oriented in an orthogonal manner. However, vertical side 102 and horizontal side 104 may also be neither vertical nor horizontal and may be non-orthogonal. Disposed on optical mounting frame 101 are first optical mount 110, second optical mount 120, third optical mount 130 and fourth optical mount 140. Optical mounts 110, 120,130 and 140 are shown retaining optical components 111, 121, 131, and 141 respectively. Optical mounts 110, 120, 130 and 140 have first vertical leg 112, second vertical leg 122, third vertical leg 132, and fourth vertical leg 142, respectively, together with first horizontal leg 114, second horizontal leg 124, third horizontal leg 134, and fourth horizontal leg 144, respectively. Optical mounts 110, 120, 130 and 140 are fabricated pieces from the same suitable material having desirable mechanical and thermal expansion characteristics, and may contain first component riser 119, second component riser 129, third component riser 139 and fourth component riser 149, respectively, which function to retain the optical component in an elevated position above optical mounting frame 101.

Optical mounts 110, 120, 130 and 140 are coupled to optical mounting frame 101 through first vertical attachment assembly 116, second vertical attachment assembly 126, third vertical attachment assembly 136 and fourth vertical attachment assembly 146, respectively, and similarly with first horizontal attachment assembly 118, second horizontal attachment assembly 128, third horizontal attachment assembly 138 and fourth horizontal attachment assembly 148, respectively, all of which may be any type of known attachment means which provide many desirable characteristics of strength, rigidity, light weight, ease of use, etc.

Figure 2:
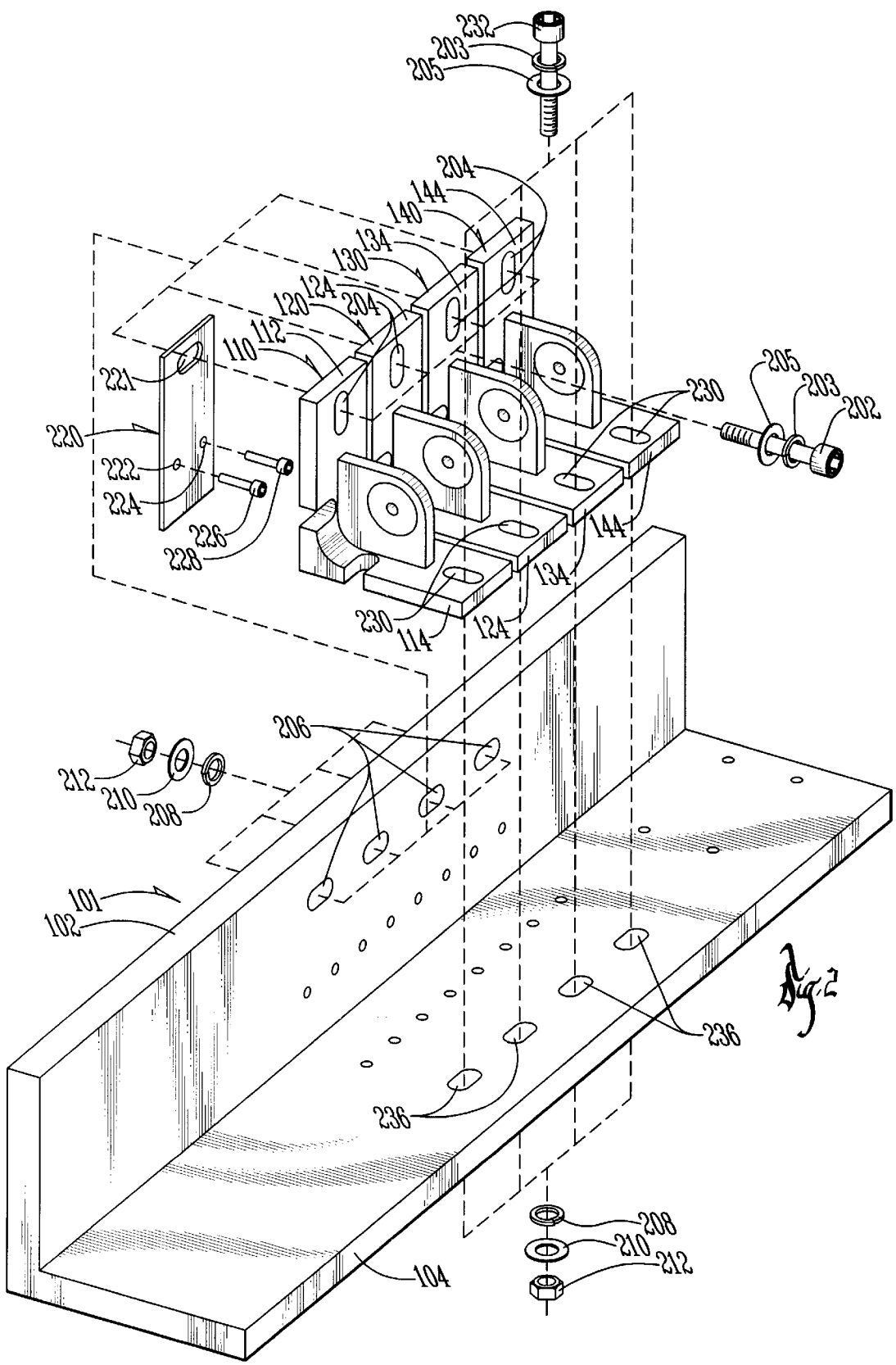
FIG. 2 is a simplified exploded diagram of the optical mounting frame of FIG. 1, where the dotted and dashed lines show the orientation of objects when in an assembled state.

Now referring to FIG. 2, there is shown an optical mounting frame 101 of FIG. 1. The cooperation of optical mounts 110, 120, 130 and 140 with optical mounting frame 101 can be better understood by examining the connection of first optical mount 110, as a representative of optical mounts 120,130 and 140 with optical mounting frame 101. First vertical attachment assembly 116 of FIG. 1 can be better understood in relation to a first retaining bolt 202, having a lock washer 203, and flat washer 205 thereon, which is inserted through elongated vertical mount slot 204 located in first vertical leg 112, through a spacer slot 221 in spacer 220 which is coupled to vertical side 102 by use of spacer screw 226 and spacer screw 228 which are inserted through spacer screw holes 222 and 224 respectively. First retaining bolt 202 extends through first elongated frame slot 206 located in vertical side 102 and thereafter, first retaining bolt 202 couples with washer 208 and washer 210 and retaining bolt nut 212. Horizontal side 104 is coupled to first horizontal leg 114 in an identical fashion as vertical side 102 is coupled to first vertical leg 112 as described above. A second retaining bolt 232 may be placed through horizontal elongated mount slot 230 and second elongated frame slot 236.

Figure 3:
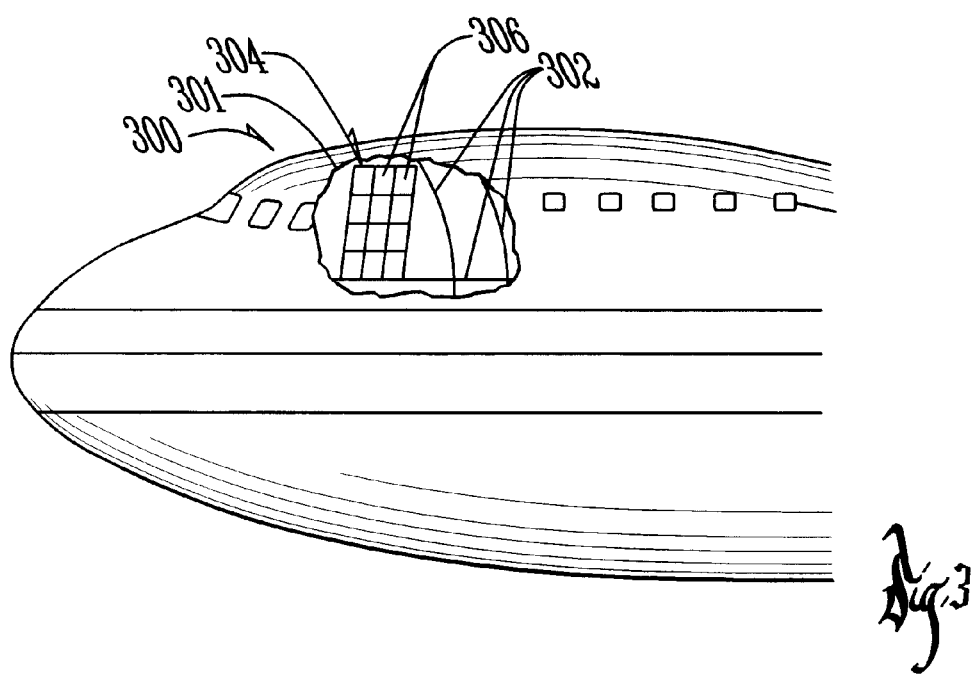
FIG. 3 is a cutaway view of portions of an aircraft of the prior art.

Now referring to FIG. 3, there is shown a cutaway view of an aircraft, of the prior art, generally designated 300, having a cutaway portion 301 exposing a structural frame 302 and an avionics rack 304 having at least one avionics receiving station 306 therein.

In operation, the present invention provides a compact, cost-effective, stable airborne optical mounting apparatus as follows: 100 may be rigidly disposed in cabinet or housing, not shown, or 100 may be disposed in such a cabinet so as to reduce shock from avionics rack 304 when 100 is inserted in an avionics receiving station 306. Either approach of a rigid or shock-absorbing coupling of 100 to structural frame 302, either directly or through avionics rack 304, are well known in the art.

Irrespective of the coupling between 100 and structural frame 302, optical component 111 is securely coupled to optical mounting frame 101 through first optical mount 110. The placement of optical component 111 is adjustable in three axes. Alignment of optical component 111 is achieved by adjusting the placement of first optical mount 110 horizontally by use of spacer 220 and then securing first horizontal leg 114 with second retaining bolt 232. The shape of horizontal elongated mount slot 230 allows for the horizontal adjustment made by spacer 220. Vertical adjustment of first optical mount 110 can be accomplished in an identical manner. FIG. 2 shows no device similar to spacer 220 disposed between first horizontal leg 114 and horizontal side 104, but if vertical adjustment were required, a similar spacer would be used. Adjustment in the Z direction, i.e. orthogonal to both the vertical and horizontal directions as used in this description, is accomplished by the shape of first elongated frame slot 206 and second elongated frame slot 236. Alignment of optical component 111 is maintained by several features of the present invention, including the stable and rigid angular shape of optical mounting frame 101 and first optical mount 110 and the matching of thermal coefficients of materials in optical mounts 110, 120, 130, and 140.

It is thought that the method and apparatus of the present invention will be understood from the foregoing description, and that it will be apparent that various changes may be made in the form, construct steps and arrangement of the parts and steps thereof, without departing from the spirit and scope of the invention or sacrificing all of their material advantages. The form herein described is merely a preferred exemplary embodiment thereof.

We claim:

1. An apparatus for mounting and aligning optical components within an aircraft where the apparatus comprises:

an optical mounting frame having mounting sides thereon with a plurality of elongated frame slots therein;

a plurality of optical mounts having a plurality of elongated mount slots therein, each of said optical mounts coupled to an optical component; and a plurality of attachment assemblies placed in said plurality of slots and interconnecting said optical mounting frame and said plurality of optical mounts.

2. An apparatus of claim 1 wherein the optical mounting frame further comprises a vertical side with a plurality of first elongated frame slots therein and a horizontal side with a plurality of second elongated frame slots therein.

3. An apparatus of claim 2 wherein each of said plurality of optical mounts further comprises:

a vertical leg with an elongated vertical mount slot;

a horizontal leg with an elongated horizontal mount slot; and a component riser for mounting the optical component on the optical mount.

4. An apparatus of claim 3 further comprising a spacer between the horizontal leg of one of said plurality of optical mounts and the horizontal side of the optical mounting frame to adjust the optical mount in a vertical direction.

5. An apparatus of claim 3 further comprising a spacer between the vertical leg of one of said plurality of optical mounts and the vertical side of the optical mounting frame to adjust the optical mount in a horizontal direction.

6. An apparatus of claim 2 wherein the plurality of first elongated frame slots are parallel to the plurality of second elongated frame slots permitting adjustment of the plurality of optical mounts in a Z direction.

7. An apparatus of claim 2 wherein the plurality of elongated mount slots are orthogonal with the plurality of first elongated frame slots and the plurality of second elongated frame slots permitting adjustment of the plurality of optical mounts in a vertical and a horizontal direction.

8. An apparatus of claim 1 wherein said attachment assemblies comprise bolts, nuts, and washers.

9. An apparatus of claim 1 wherein said each of plurality of optical mounts have predetermined matched coefficients of thermal expansion.

10. An apparatus for mounting and aligning optical components on an aircraft comprising:

an optical mounting frame having a vertical side with a plurality of first elongated frame slots therein and a horizontal side with a plurality of second elongated frame slots therein;

a plurality of optical mounts each optical mount comprising a vertical leg with an elongated vertical mount slot, a horizontal leg with an elongated horizontal mount slot, and a component riser for mounting the optical component on the optical mount; and a plurality of attachment assemblies placed in said plurality of first elongated frame slots and elongated vertical mount slots and in said plurality of second elongated frame slots and elongated horizontal mount slots for interconnecting said optical mounting frame and said plurality of optical mounts.

11. An apparatus of claim 10 herein the plurality of first elongated frame slots are parallel to the plurality of second elongated frame slots permitting adjustment of the plurality of optical mounts in a Z direction.

12. An apparatus of claim 10 wherein the plurality of elongated mount slots are orthogonal with the plurality of first elongated frame slots and the plurality of second elongated frame slots permitting adjustment of the plurality of optical mounts in a vertical and a horizontal direction.

13. An apparatus of claim 12 further comprising a spacer between the horizontal leg of one of said plurality of optical mounts and the horizontal side of the optical mounting frame to adjust the optical mount in the vertical direction.

14. An apparatus of claim 12 further comprising a spacer between the vertical leg of one of said plurality of optical mounts and vertical side of the optical mounting frame to adjust the optical mount in the horizontal direction.

15. An apparatus of claim 10 wherein said attachment assemblies comprise bolts, nuts, and washers.

16. An apparatus of claim 10 wherein each of said optical mounts have matched thermal coefficients of expansion.

17. A method of aligning optical components on an aircraft comprising the steps of:

securing a plurality of optical components to a plurality of optical mounts having a plurality of mounting surfaces and elongated mounting slots;

coupling said plurality of optical mounts to an optical mounting frame having a plurality of frame mounting surfaces with a plurality of elongated frame slots using a plurality of attachment assemblies;

adjusting said plurality of optical mounts to align the plurality of optical components; and securing said plurality of optical mounts to said optical mounting frame with said plurality of attachment assemblies.

18. A method of claim 17 wherein said step of adjusting said plurality of optical mounts further comprises the step of sliding a first optical mount along a first elongated slot and a second elongated slot in the optical mounting frame in a Z direction to produce alignment.

19. A method of claim 17 wherein said step of adjusting said plurality of optical mounts further comprises the step of inserting a spacer between a vertical side of the optical mounting frame and a first vertical leg of a first optical mount to slide the first optical mount in a horizontal direction to produce alignment.

20. A method of claim 17 wherein said step of adjusting said plurality of optical mounts further comprises the step of inserting a spacer between a horizontal side of the optical mounting frame and a first horizontal leg of a first optical mount to slide the first optical mount in a vertical direction to produce alignment.

* * * * *